United States Patent
Li et al.

(10) Patent No.: US 8,438,163 B1
(45) Date of Patent: May 7, 2013

(54) AUTOMATIC LEARNING OF LOGOS FOR VISUAL RECOGNITION

(75) Inventors: Yuan Li, Los Angeles, CA (US); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/314,061

(22) Filed: Dec. 7, 2011

Related U.S. Application Data

(60) Provisional application No. 61/420,675, filed on Dec. 7, 2010.

(51) Int. Cl.
*G06F 17/30* (2006.01)
(52) U.S. Cl.
USPC ............ 707/737; 707/706; 707/722; 707/754; 707/915; 382/159; 382/195; 382/209
(58) Field of Classification Search .................. 707/706, 707/722, 737, 754, 915, 999.001; 382/159, 382/195, 209
See application file for complete search history.

(56) References Cited

U.S. PATENT DOCUMENTS

| | | | |
|---|---|---|---|
| 7,787,711 B2 * | 8/2010 | Agam et al. | 382/305 |
| 7,840,538 B2 * | 11/2010 | Joshi et al. | 707/672 |
| 7,962,500 B2 * | 6/2011 | van Zwol et al. | 707/758 |
| 2006/0083304 A1 * | 4/2006 | Pan et al. | 375/240.08 |
| 2008/0082477 A1 * | 4/2008 | Dominowska et al. | 707/1 |
| 2010/0092093 A1 * | 4/2010 | Akatsuka et al. | 382/203 |
| 2012/0002880 A1 * | 1/2012 | Lipson et al. | 382/195 |
| 2012/0263385 A1 * | 10/2012 | van Zwol et al. | 382/201 |

* cited by examiner

*Primary Examiner* — Dennis Truong
(74) *Attorney, Agent, or Firm* — Fish & Richardson P.C.

(57) ABSTRACT

Methods, systems, and apparatus, including computer programs encoded on a computer storage medium, for automatically extracting logos from images. Methods include generating a query list including a plurality of logo search queries, for each logo search query of the plurality of logo search queries: generating a plurality of image search results, each image search result including image data, and clustering the plurality of image search results into a plurality of clusters, each cluster including a plurality of images of the plurality of image search results, extracting, for each cluster of the plurality of clusters, a representative image to provide a plurality of representative images, and a name corresponding to the representative image to provide a plurality of names, and providing the plurality of representative images and the plurality of names to a logo index, the logo index being accessible to identify one or more logo images in a query image.

19 Claims, 10 Drawing Sheets

AUTOMATIC LEARNING OF LOGOS FOR VISUAL RECOGNITION

CROSS-REFERENCE TO RELATED APPLICATIONS

This application claims the benefit of U.S. Prov. Pat. App. No. 61/420,675, filed Dec. 7, 2010, the disclosure of which is expressly incorporated herein by reference in its entirety.

BACKGROUND

This specification generally relates to visual recognition within images, and more particularly to visual recognition of logos within images.

Logos provide an important visual form of identification of commercial brands and/or economic or academic entities. Building a system that is able to recognize logos requires the knowledge of a large set of logo names and an appearance model that corresponds to each logo name. Manual or human-supervised collection of such information is laborious and inefficient.

Although data mining techniques have been proposed for other object categories (e.g., faces, landmarks), these techniques are not readily applicable to logos. In particular, there are substantial differences between logos and such other object categories. For example, automatic learning of face models depends on face detection, whereas general logo detection is not feasible. As another example, the data source of landmark model learning mainly consists of web photo galleries with geographical or content tags, which is not applicable to logos as well.

SUMMARY

In general, innovative aspects of the subject matter described in this specification may be embodied in methods that include the actions of generating a query list including multiple logo search queries, for each logo search query of the plurality of logo search queries: generating multiple image search results, each image search result including image data, and clustering the plurality of image search results into multiple clusters, each cluster including a plurality of images of the plurality of image search results, extracting, for each cluster of the plurality of clusters, a representative image to provide a plurality of representative images, and a name corresponding to the representative image to provide a plurality of names, and providing the plurality of representative images and the plurality of names to a logo index, the logo index being accessible to identify one or more logo images in a query image.

These and other implementations may each optionally include one or more of the following features. For instance, generating a query list includes: searching a query log based on a term, identifying one or more image search queries of the query log corresponding to the term, and populating the query list with the one or more image search queries; each of the plurality of image search results includes a document identification and image meta-data; the actions further include: determining an image score for each image of the image search results, comparing the image score of an image to a threshold image score, and removing the image from the image search results when the image score is less than the threshold image score; the actions further include: determining a number of images populating a cluster of the plurality of clusters, comparing the number of images to a threshold number of images, and removing the cluster from the plurality of clusters when the number of images is less than the threshold number of images; clustering includes: generating an image template for each image of the plurality of image search results to provide a plurality of image templates, determining a similarity score based on a first image template and a second image template, and clustering an image corresponding to the first image template and an image corresponding to the second image template into a cluster when the similarity score is greater than a threshold similarity score; extracting a representative image includes: identifying an image of a plurality of images in each cluster having a highest document count score as an initial image, comparing the initial image to other images in the plurality of images, identifying an image of the other images as a matching image, and identifying one of the initial image and the matching image as a representative image of a corresponding cluster; identifying an image of the other images as a matching image includes: determining a matching score based on the initial image and the image of the other images, and identifying the image of the other images as the matching image when the matching score is greater than a threshold matching score; identifying one of the initial image and the matching image as a representative image of a corresponding cluster includes: determining a quality score of the initial image, determining a quality score of the matching image, and identifying the initial image as the representative image when the quality score of the initial image is greater than the quality score of the matching image, and identifying the matching image as the representative image when the quality score of the matching image is greater than the quality score of the initial image; the actions further include: identifying a first logo search query and a second logo search query as duplicate logo search queries in the query list, and merging a representative image and name corresponding to the first logo search query and a representative image and name the second logo search query to provide a merged representative image and name; identifying a first logo search query and a second logo search query as duplicate logo search queries includes: removing pre-defined terms from each of the first logo search query and the second logo search query to provide a modified first logo search query and a modified second logo search query, respectively, and determining that the modified first logo search query and the modified second logo search query exactly match; identifying a first logo search query and a second logo search query as duplicate logo search queries includes: determining an edit distance between the first logo search query and the second logo search query, and determining that the edit distance is less than a threshold edit distance; identifying a first logo search query and a second logo search query as duplicate logo search queries includes: determining a first set of image identifiers corresponding to image search results of the first logo search query, determining a second set of image identifiers corresponding to image search results of the second logo search query, and determining that the first logo search query and the second logo search query are duplicates based on the first set of image identifiers and the second set of image identifiers; determining that the first logo search query and the second logo search query are duplicates is based on an intersection of the first set of image identifiers and the second set of image identifiers; determining that the first logo search query and the second logo search query are duplicates is based on a ratio of overlapping image identifiers of the first set of image identifiers and the second set of image identifiers; the actions further include matching images between image search results associated with each of the first logo search query and the second logo search query to provide a number of matched images, wherein identifying a first logo search query and a second logo search query as duplicate logo search queries is based on the number of matched images; the actions further include: processing one or more representative images of the logo index to determine a presence of product packaging in the one or more representative images, and removing a representative image and name from the logo index when the presence of product packaging is determined in the representative image; the actions further include: processing one or more representative images of the logo index to determine a presence of one or more faces in the one or more representative images, and removing a representative image and name from the logo index when the presence of one or more faces is determined in the representative image.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Implementations of the present disclosure are generally directed to automatically extracting images for logos and using the extracted logo images to identify logos in search query images input by a user. In some implementations, a list of potential logo names and candidate images associated with each name are obtained from a logo image search. Clustering and post processing are applied to select representative images for each logo to build a logo recognition model. The logo recognition model can be provided as a logo index and can be used to identify one or more logos within an image submitted by a user as a search query image.

Figure 1:
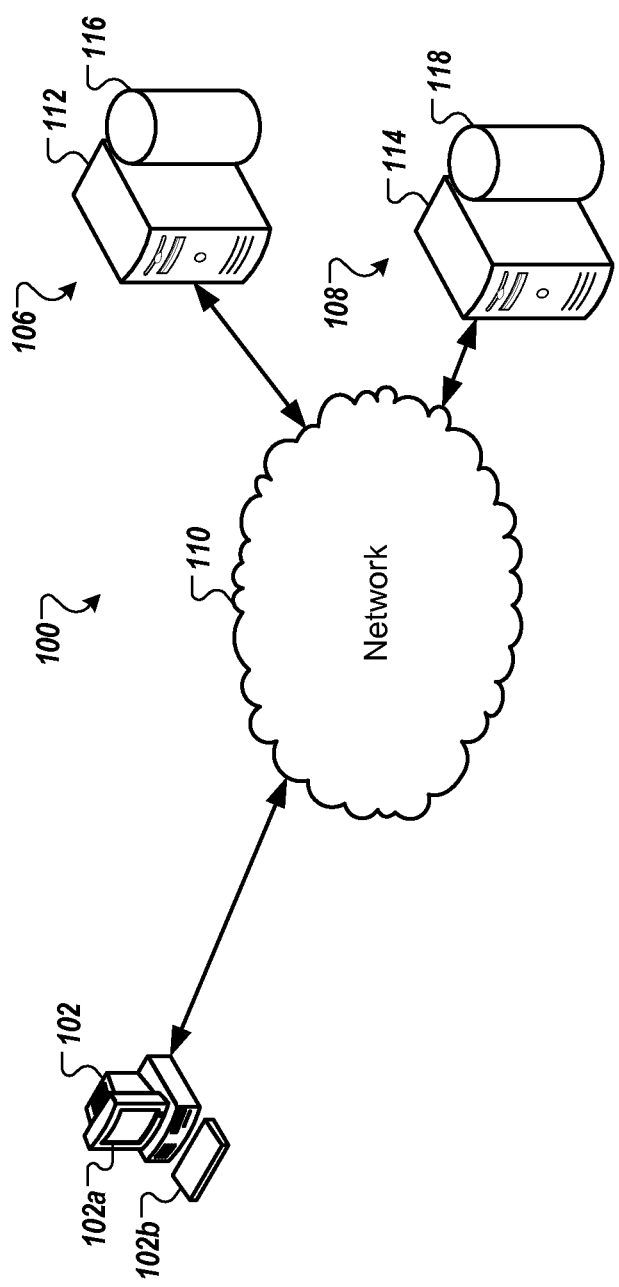
FIG. 1 is a block diagram of an example system for carrying out implementations of the present disclosure.

FIG. 1 is a block diagram of an example system 100 for carrying out implementations of the present disclosure. The system 100 can include a client 102 and computer systems 106, 108. The computer systems 106, 108 can include servers 112, 114 and databases 116, 118, respectively. In some implementations, the system 100 may represent a client/server system supporting multiple computer systems (e.g., computer systems 106, 108) including one or more clients (e.g., client 102) and/or one or more servers (e.g., servers 112, 114) that are connectively coupled for communication with one another over a network 110. In some implementations, the clients (e.g., client 102) may be directly connected to the one or more servers (e.g., servers 112, 114) (without connecting by way of network 110).

The client 102 can represent various forms of processing devices including, but not limited to, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. In example implementations, the client 102 may access data stored at the server 116 to generate a logo index that is subsequently stored at the server 118.

The servers 112, 114 can represent various forms of servers including, but not limited to a web server, an application server, a proxy server, a network server, or a server farm. For example, the server 112 can be an application server that executes software accessed by client 102. In some implementations, the server 112 provides an image searching service that processes one or more image search queries received from the client 102, retrieves one or more images corresponding to the one or more search queries, and transmits corresponding image data to the client 102 over the network 110. In some implementations, a user can invoke applications available on the server 112 in a web browser running on a client (e.g., client 102). Each application can individually access data from one or more repository resources (e.g., databases 116, 118). For example, the servers 112, 114 can access databases 116, 118, respectively.

In some implementations, the client device 102 may communicate wirelessly through a communication interface (not shown), which may include digital signal processing circuitry where necessary. The communication interface may provide for communications under various modes or protocols, such as Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver (not shown). In addition, short-range communication may occur, such as using a Bluetooth, WiFi, or other such transceiver.

In some implementations, the system 100 can be a distributed client/server system that spans one or more networks such as network 110. The network 110 can be a large computer network, such as a local area network (LAN), wide area network (WAN), the Internet, a cellular network, or a combination thereof connecting any number of mobile clients, fixed clients, and servers. In some implementations, each client (e.g., client 102) can communicate with the servers 112, 114 via a virtual private network (VPN), Secure Shell (SSH) tunnel, or other secure network connection. In some implementations, the network 110 can include the Internet, a wireless service network and may include the Public Switched Telephone Network (PSTN). In other implementations, the network 110 may include a corporate network (e.g., an intranet) and one or more wireless access points.

The client (e.g., client 102) can establish its own session with the servers 112, 114. Each session can involve two-way information exchange between the computer systems 106, 108 and the client 102. For example, a Hypertext Transfer Protocol (HTTP) session can allow the association of information with individual users. A session can be a stateful session, in which at least one of the communicating parts (e.g., the servers 112, 114 or the client (e.g., client 102)) stores information about the session history in order to be able to communicate. Alternatively, stateless communication during a stateless session includes independent requests with associated responses.

Figure 2:
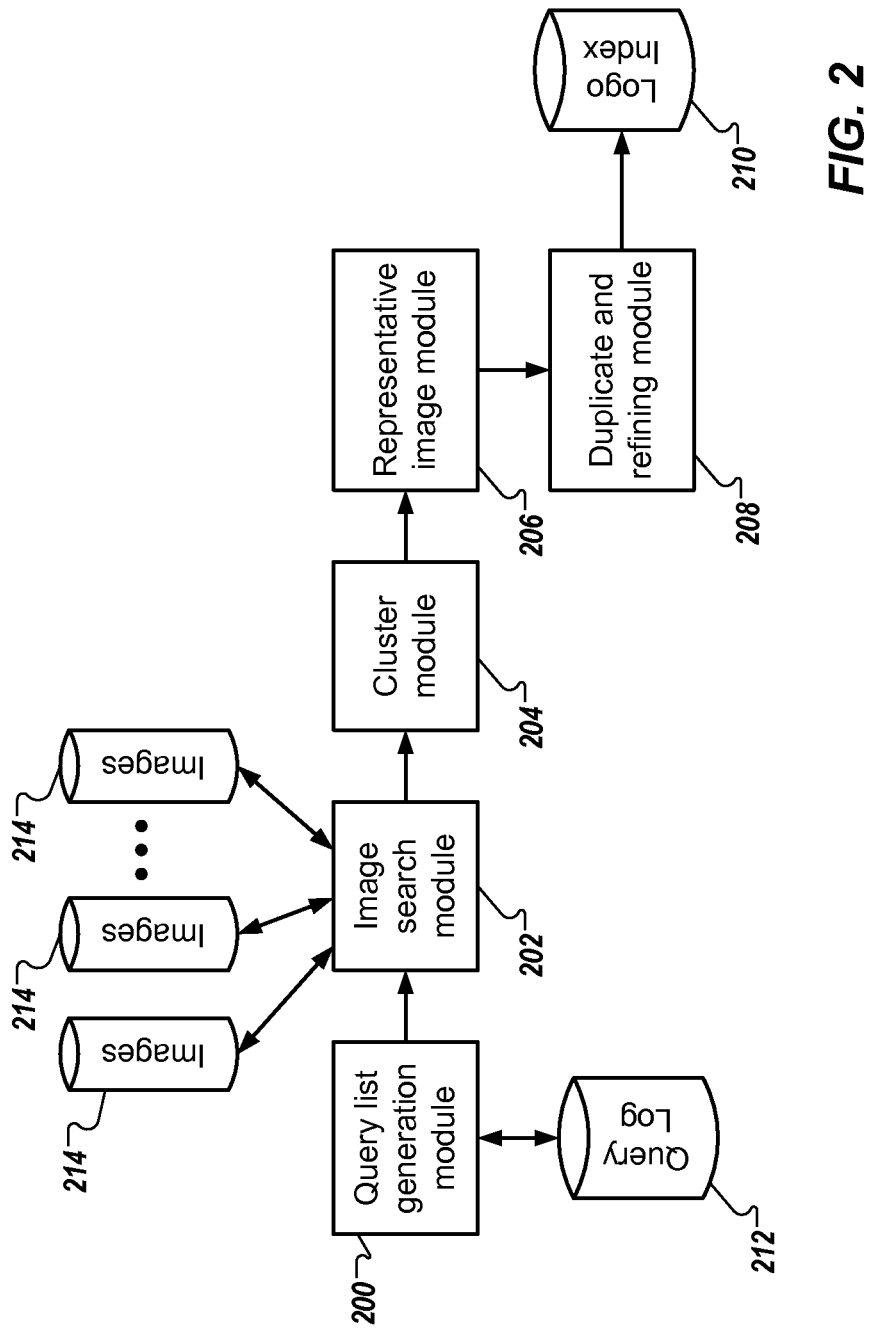
FIG. 2 is a block diagram of example modules that can execute implementations of the present disclosure.

FIG. 2 is a block diagram of example modules that can execute implementations of the present disclosure. The example modules include a query list generation module 200, an image search module 202, a cluster module 204, a representative image module 206 and a duplicate and refining module 208. As discussed in further detail herein, the modules retrieve and process image data to generate and/or populate a logo index 210. In some implementations, each module can be provided as software modules that run on one or more computing devices (e.g., the client 102 of FIG. 1, or one or both of the computer systems 108, 108). In some implementations, the logo index 210 can be provided as a database (e.g., the database 118 of FIG. 1).

As discussed in further detail herein, the query list generation module 200 can access a query log 212 to generate a query list. The query log 212 can provide multiple anonymized search queries. The query list includes one or more image search queries. The query list is provided to the image search module 202. The image search module 202 processes each of the one or more image search queries of the query list using an image searching service to retrieve one or more images and corresponding image data from one or more image databases. The image search module 202 provides the image data to the cluster module 204. The cluster module 204 clusters the images based on the image data and provides the clusters to the representative image module 206. The representative image module 206 determines a representative image for each cluster and a cluster name. The representative image module 206 provides the representative images and names to the duplicate and refining module 208. The duplicate and refining module 208 processes the representative images and names to remove duplicate representative images and to refine the name corresponding to each remaining representative image. The duplicate and refining module 208 provides the representative images and corresponding names to the logo index 210.

Figure 3:
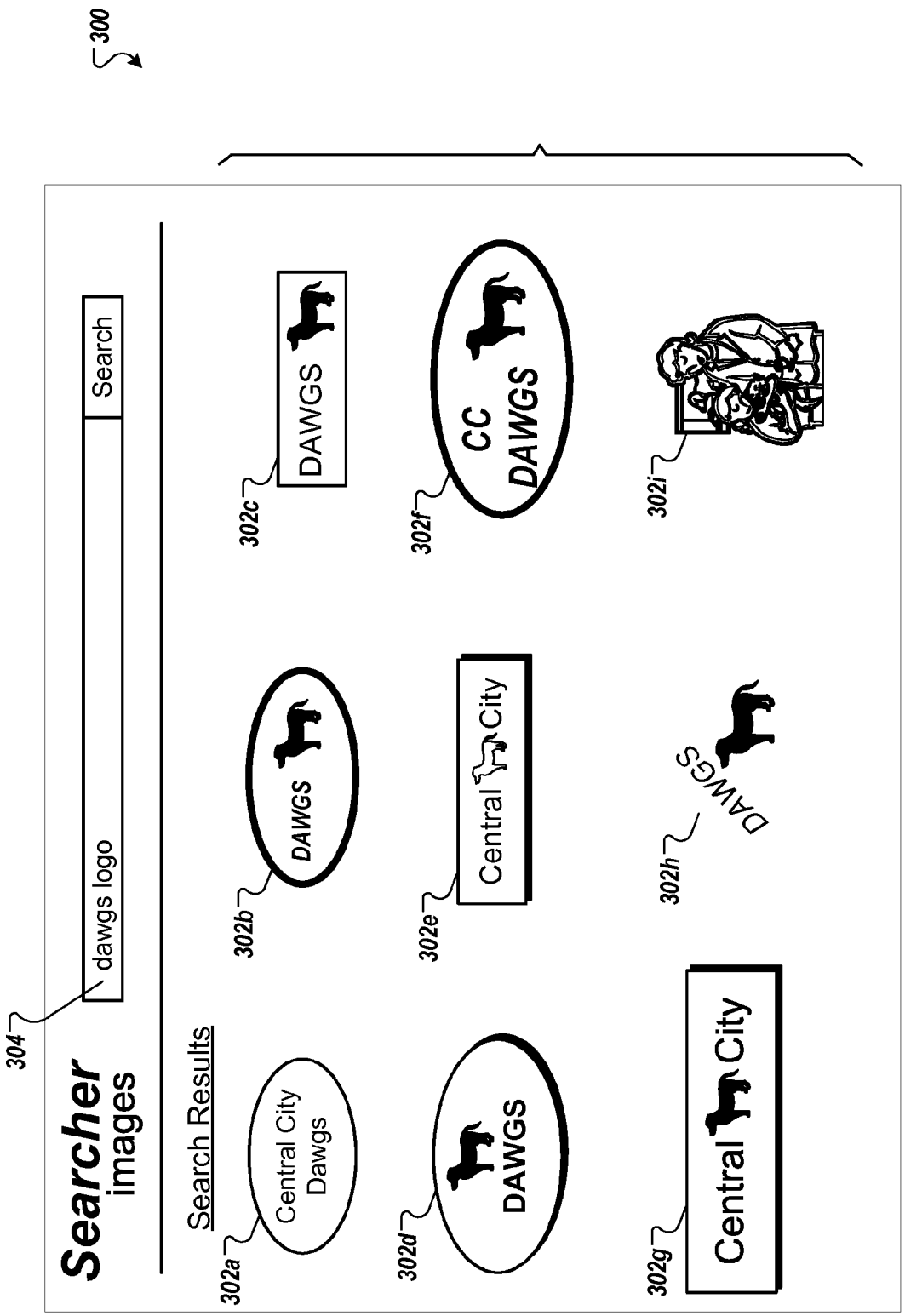
FIG. 3 is a screen-shot illustrating example image search results for a particular image search query.
Figure 4:
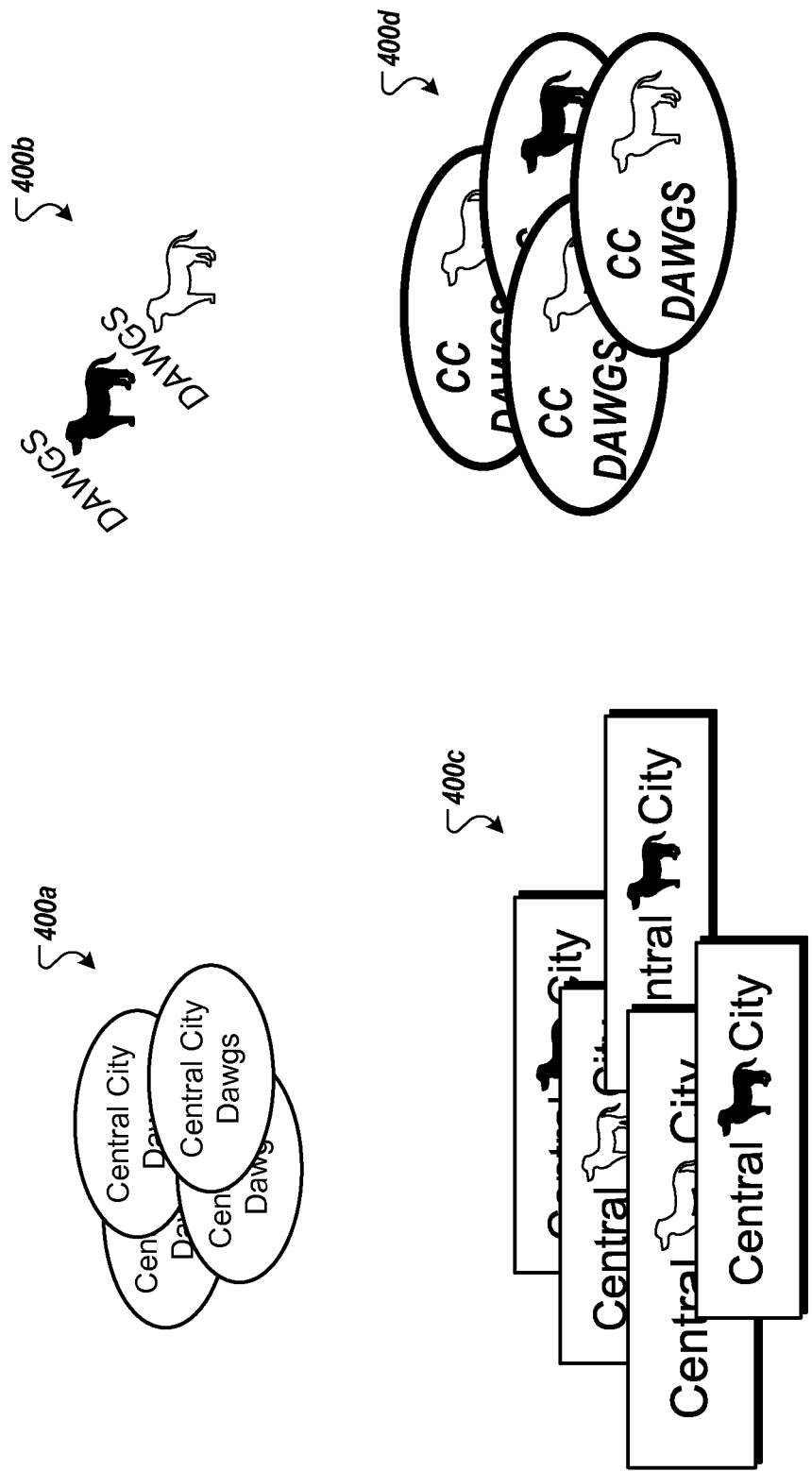
FIG. 4 illustrates example clustering of the image search results of FIG. 3.
Figure 5:
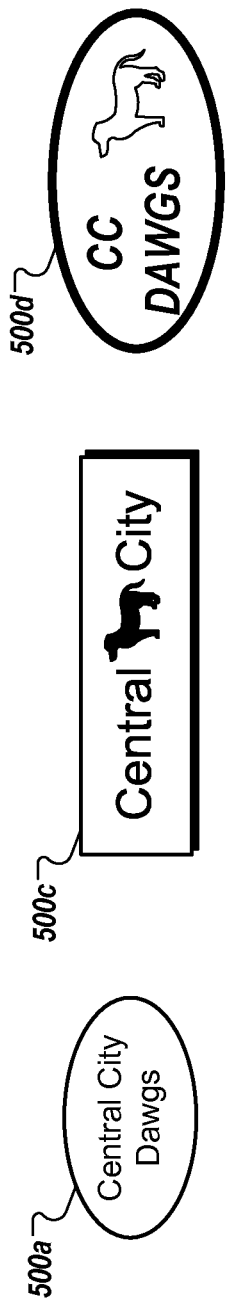
FIG. 5 illustrates example representative images corresponding to the clusters of FIG. 4.

Referring now to FIGS. 3-5 implementations of the present disclosure will be described. It is appreciated that the example implementation of FIGS. 3-5 is for purposes of illustration and does not limit the present disclosure.

In some implementations, a query list is generated. For example, the query list generation module 200 of FIG. 2 can be executed using a computing device (e.g., the client 102 of FIG. 1) and can generate the query list. The query list includes multiple example image search queries that can be used as input to an image searching service. The query list can be generated based on a log of image search queries (e.g., query log 212 of FIG. 2) that have been input to the image searching service for a given period of time.

In some implementations, the search terms populating the query list include the most popular search queries that include the word "logo." For example, the query list can include some number of the most popular image search queries that contain "logo" and that are obtained from a query log. The popularity of an image search query can be determined based on the number of times the particular image search query appears in the query log. The query log can span a given time range (e.g., the last 1 week, the last 2 weeks, the last 1 month, the last 2 moths, the last 6 months, the last year). In some implementations, only image search queries for a given language (e.g., English) are considered. In some implementations, only image search queries having one or more given forms are considered. Example forms include "logo *" or "* logo," where the character "*" indicates a wildcard search term, which can be used in an image search query to represent one or more other characters.

FIG. 3 is a screen-shot 300 illustrating example image search results 302 for a particular image search query 304. For example, the image search results can be received by the image search module 202 of FIG. 2. In some implementations, the image search results can be displayed to a user (e.g., on the client 102 of FIG. 1). The image search queries of the query list are each input to an image searching service to generate one or more search results. For example, the image search module 202 of FIG. 2 can be executed using a computing device (e.g., the client 102 of FIG. 1) and can input each image search query of the query list to an image searching service. In some implementations, the number of images that are provided in the image search results 302 can be limited to a threshold number of images (e.g., 50 images, 100 images, 150 images, 200 images).

In the example of FIG. 3, the example image searching service includes "Searcher images" and the example image search query 304 includes "dawgs logo." That is, the example image search query "dawgs logo" is one of multiple image search queries that is input to the "Searcher images" image searching service to generate multiple results. The example image search results include multiple images 302a-302i corresponding to multiple logos for a particular entity. In the example of FIG. 3, the plurality of images correspond to a fictional sports team, the Central City Dawgs. In particular, the images 302a-302i include images that may be associated with a particular entity.

Although the example of FIGS. 3-5 include a fictional entity, implementations of the present disclosure are equally applicable to logos associated with entities, such as corporations, universities, sporting teams, for-profit organizations, non-profit organizations, hospitals, institutions, among many others. Implementations of the present disclosure are also applicable to brand logos. In general, implementations of the present disclosure are applicable to any logos, regardless of their source.

Referring again to FIG. 3, each image 302a-302i includes a corresponding document identification (DocID) and meta-data. The meta-data for each image can include, but is not limited to, a URL of the image, a URL of a webpage where the image is referred to (e.g., referrer URL), a width and/or a height of the image (e.g., measured in pixels), a size of the image (e.g., measured in bytes), one or more scores associated with the image (e.g., a clipart score), data as to whether the image contains certain objects (e.g., face, product package), and/or data as to whether the image is a collage image (e.g., containing multiple objects besides the particular logo of interest). The images 302a-302i are processed using a filter to filter out images that may include clipart images. The term "clipart" generally refers to a pre-made image in a library of pre-made, graphical images that is used to illustrate any medium. Each image is processed to determine a clipart score associated with the particular image. In some implementations, a clipart scoring module can be provided as part of an image search product, and can be determined using a classifier that is trained using a machine learning algorithm. By way of non-limiting example, given a set of images labeled as clipart and another set labeled as non-clipart, a program can be used to extract image features that can distinguish (e.g., statistically) clipart images from non-clipart images. A clipart filter can be applied, and any images having a clipart score that is lower than a threshold clipart score is removed from the image results.

In the example of FIG. 3, the image 302i includes a clipart image. Consequently, the clipart score for image 302i would identify the image 302i as being a clipart image. For example, the clipart score for the image 302i can be less than the threshold clipart score. Consequently, the image 302i would be removed from the image search results 302 upon application of the clipart filter.

The remaining images are processed and are clustered into groups of images. For example, the cluster module 204 of FIG. 2 can be executed using a computing device (e.g., the client 102 of FIG. 1) and can cluster the images into groups/clusters of images. In some implementations, the image clustering is achieved by extracting a descriptor for image interest points and building an image template for each image. A descriptor includes information extracted from local pixels around an interest point. An image interest point is a point in the image that can have a clear definition (e.g., mathematically well-founded), have a well-defined position in image space, have a local image structure that is rich in terms of local information contents, and that is stable under local and global perturbations in the image domain. A template includes the extracted information of the image and a set of descriptors of all interest points in the image. The present disclosure includes templates in clustering, because this kind of extracted information is more effective than raw image data in terms of computing image similarity. However, any image appearance based clustering can be used (e.g., the whole pipeline is not specific to the extraction of interest points, descriptors and/or templates).

In some implementations, an image template extraction process is provided. Given an image, an image template is generated by resizing and normalizing the image, extracting corner points, and computing local image feature vectors based on pixel values corresponding to each of the detected corner points. In some implementations, transformations such as Gabor wavelet and principal component analysis (PCA) may be applied. A set of local image features (e.g., location, scale and a corresponding feature vector) is aggregated as the image template of the input image.

The images of the image search results are clustered based on their respective image templates. In some implementations, a matcher is built using the image templates. The matcher can be provided as a module that has the knowledge of a set of reference images. When given a query image, the matcher retrieves and outputs reference images that are similar to the query (usually for each similar reference image, a match score is also provided to measure the similarity). A match graph among the input images is generated by matching each image against the matcher. In some implementations, the match graph is provided as a directed graph and each image is provided as a node in the graph. If a pair of images are matched, based on their respective image templates, an edge is provided between the corresponding nodes. In some implementations, the image match graph is clustered using agglomerative clustering on a shortest-paths distance matrix. For example, each image can initially be provided as its own cluster. Among all current clusters, two clusters having the shortest distance therebetween are merged.

In some implementations, a distance between a pair of images can be determined by the matcher. In such implementations, the matcher can provide a similarity score between a pair of images. For example, the matcher can be built using all images as reference images. For any image A, the image A is queried against the matcher, and a number of matches (e.g., {B1, B2, . . . }) having associated similarity scores (e.g., {s1, s2, . . . }) are returned. The distance between image A and any image $B_i$ can be derived from the respective score $s_i$ (e.g., using a transformation). For an image C (i.e., not in {B1, B2, . . . }), the distance between image A and image C be infinitely large. In some implementations, a distance between a pair of clusters can be determined based on the distance for an image pair. In such implementations, a complete linkage, single-linkage, and/or average linkage in the page can be used. Merging of the clusters can be repeated until a pre-defined condition is satisfied. In some implementations, clustering is repeated for a pre-determined number of iterations. In some implementations, clustering is repeated until remaining distances between clusters are each greater than a threshold distance.

FIG. 4 illustrates example clustering of the image search results of FIG. 3. The example clustering of FIG. 3 includes clusters 400a-400d. The cluster 400a, for example, corresponds the image 302a of FIG. 3 and other, sufficiently similar images provided in the image search results 302. As another example, the cluster 400b corresponds the image 302h of FIG. 3 and other, sufficiently similar images provided in the image search results 302.

In some implementations, the clusters are filtered based on cluster size. For example, clusters having fewer than a threshold number of images (e.g., 3 images, 5 images) included therein are discarded. In the example of FIG. 4, and using 3 images as a threshold number of images, the cluster 400b is discarded.

For each remaining cluster, a single, representative image is extracted. For example, the representative image module 206 can be executed on a computing device (e.g., the client 102 of FIG. 1) and can extract the representative images. In some implementations, the representative image is extracted in two rounds. In a first round, the image having the highest document count (doccount) score is selected as an initial image. The doccount score can include any kind of indication of, for example, the importance or popularity of an image, and/or the relevancy of the image to the given query. An example doccount score can include the number of times an image is referred to on the web. Another example doccount score can include the number of times users selected that image in a search result page.

In a second round, all of the other images in the cluster are matched with the initial image so that a similar image of better quality may be selected as the final representative image. In some implementations, a similar image is an image that includes a matching score that is larger than a threshold matching score (e.g., 50). In some implementations, an image having of better quality, than the initial representative image, can include a similar image that has a size larger than quarter video graphics adapter (QVGA), which is defined as 320×240 pixels, and/or with a higher image quality score, than the initial representative image.

FIG. 5 illustrates example representative images corresponding to the clusters of FIG. 4. In particular, FIG. 5 includes a representative image 500a that corresponds to the cluster 400a of FIG. 4, a representative image 500c that corresponds to the cluster 400c of FIG. 4, and a representative image 500d that corresponds to the cluster 400d of FIG. 4. FIG. 5, however, does not include a representative image corresponding to cluster 400b. As noted above, and in the example provided herein, the cluster 400b is removed, because it is populated with less than the threshold number of images (e.g., 3 images).

In accordance with the processes provided herein, a preliminary mapping is established between logo images and names. In some circumstances, however, multiple different image search queries can refer to the same logo. Continuing with the example discussed herein, the image search query "dawgs logo" and "central city logo," may return overlapping results. To account for this, implementations of the present disclosure can include duplicate removal. For example, the duplicate removal and refining module 208 can be executed on a computing device (e.g., the client 102 of FIG. 1) and can remove duplicate representative images.

In some implementations, potential duplicates are found by reviewing the overlap of image search results of two image search queries, based on a similarity of the image search queries, and based on a similarity of representative images. In some implementations, the overlap of respective image search results for two image search queries can be determined by matching DocIDs of the image search results. In some examples, the DocID is a fingerprint that is determined based on the content (e.g., pixels) of an image. In this manner, images with the same DocID can be determined to be very similar to each other if not identical. In some implementations, images having the same DocID, as between a first set of image search results based on a first image search query and a second set of image search results based on a second image search query, are considered to be overlapping search results. In some implementations, image search queries are determined to be similar when there is an exact match of words in the image search queries (e.g., after removing stop words and substitution of "&" and "and"). In some implementations, image search queries are determined to be similar when an edit distance between the image search queries is less than a threshold edit distance. An edit distance can be provided as the number of operations required to transform one image search query into the other image search query.

By way of non-limiting example, an image search query (A) and an image search query (B) are considered. Measuring a similarity of A and B can be based on a number of overlapping image search result DocIDs. For example, an intersection between the image search result DocIDs of image search query (A) and the image search result DocIDs of image search query (B) can be determined. As another example, a ratio of overlapping image search result DocIDs can be determined. The intersection and ratio can indicate a similarity of the image search query (A) and the image search query (B). In some implementations, a similarity of A and B can be based on a text match between the search terms in A and the search terms in B. The ratio of overlapping image search results may be, for example, a ratio of results from image search query (A) to results from image search query (B) (or vice versa). In some implementations, a similarity of A and B can be based on a similarity of reference images. For example, the similarity of reference images can be determined based on a number of matched images, a number reference images of A, and a number of reference images of B. An image match can be defined as the matching score being greater than a threshold matching score.

In some implementations, all potential duplicate image search queries are output as entry pairs with all the scores associated like weighted graph edges. It can be determined whether duplicate pairs of image search queries should be merged and, if so, the duplicate pairs of image search queries are merged. In some implementations, a pair of image search queries can be determined to be duplicates if a number of overlapping DocIDs is greater than an overlap threshold, a ratio of overlapping DocIDs (e.g., a ratio of image search result DocIDs from image search query (A) to image search result DocIDs from image search query (B)) is greater than a ratio threshold, a text match score is greater than a text match threshold, and/or a reference image similarity score is greater than a reference image similarity threshold and the ratio of overlapping DocIDs greater than the threshold ratio.

In some implementations, even if the representative images between two clusters associated with the same or similar image query are very similar, it could occur that a representative image selected for some cluster is accidentally an outlier. Consequently, a lower threshold can be added on the ratio of overlapping DocIDs. After deciding which duplicate pairs are valid, the duplicate pairs are treated as edges in a directed graph and connected components are determined, each component corresponding to a final logo entry. Representative images corresponding to merged duplicate image search queries are also merged, with similar images being removed (e.g., an image matching score being greater than a threshold image matching score).

In some implementations, if an image search query is determined based on merging duplicates, multiple image search queries (e.g., $A\_1, A\_2, \ldots A\_n$) are available to choose from. In some implementations, the final image search query ($A_{FINAL}$) can be determined as the image search query having terms most common to the other image search queries.

For each representative image, the final image search query ($A_{FINAL}$) is used to generate a name corresponding to the representative image. In some implementations, stop words (e.g., "logo," "logos") are removed and initials are capitalized. In some implementations, accurate capitalization of the logo name can be achieved by looking at image search snippets returned for each image search query associated with the logo term. The snippets can be obtained from the image search web service, and a name map can be generated.

In some implementations, the duplicate removal process can also be used to merge multiple existing datasets. Datasets can include different sources. In some implementations, the pipeline can be applied to different image search databases. The logo images retrieved from each source may overlap and have duplicate or similar entries that can be merged.

Each representative image and the corresponding name are stored to a logo index (e.g., the logo index 210 of FIG. 2). For each representative image in the index, a uniform resource identifier (URI), such as a uniform resource locator (URL) is determined. In some implementations, a look-up is performed to retrieve the corresponding URLs as well as perdoc and other image metadata. The term "perdoc" refers to a group of image meta data including: the referrer/thumbnail/original image URLs, image dimension, file size, and various scores discussed herein. In some implementations, a database stores various image information. For example, image entries are indexed and can be looked up by key. The key can include docid, for example. The keys to the image entries are provided in the image search results. Using these keys, image metadata and the original image content can be looked up.

In some implementations, a thumbnail URL can be generated based on the DocID of a representative image. For example, the DocID can be used as an index to a thumbnail server, which stores multiple thumbnail URLs. In some circumstances, it can occur that a representative image has multiple pairs of image referrer URLs. In such circumstances, the pair with the highest referrer URL rank is selected. The referrer URL is the URL of the page where the image is referred to. For example, the URL of a web page is the referrer URL of an image displayed on the web page. The rank can be any indicator of the importance, popularity and/or relevancy of the web page. In some circumstances, it can occur that a representative image does not have a corresponding referrer URL. In such circumstances, scrape image search can be implemented to find the most similar image to the original. In some embodiments, the scrape image search may extract image information (e.g., from websites) by transforming unstructured data, typically in HTML format, into structured data that can be stored and analyzed in a central local database or spreadsheet.

Each dataset is converted into a format that can be processed by templates generation and index building binaries. The converted datasets are processed to compute the template and build indices. This provides an initial version of a logo index. In some implementations, further clean-up of the initial version of the logo index can be performed to reduce the noise in logo names (i.e., images associated with wrong logo names), and removing non-logo images (e.g., images of product packaging).

In some implementations, the clean-up can include an automatic clean-up by matching the index against itself. In such implementations, it can be assumed that very similar images should have the same logo names. Each representative image in the index is used as a query image, and if any match is found (e.g., based on a matching threshold) and the two matched images have different names, the name associated with the image that comes from a larger image cluster is selected for both images. In some circumstances, an identical image can be associated with multiple logo names in the index. The automatic clean-up can again be applied to reduce such redundancies.

In some implementations, the clean-up can include a manual clean-up. For the above-discussed automatic clean-up, and in some implementations, matched images and automatically selected name changes can be visualized as HTML files with Java scripts. In this manner, a user can inspect the results and make manual adjustments. Each manual adjustment can be output as a change list in the same format as automatic change lists. The change lists from the automatic and manual clean-ups can be merged and processed. In some implementations, a user can make manual changes directly on image files generated from the logo index by changing file names. These changes can be extracted to form a change list.

In some implementations, non-logo images can be removed from the logo index. For example, images of product packaging can be identified by matching all of the images in the logo index against a product matching service. Any images corresponding to product packaging can be removed from the logo index. In some implementations, images in which faces are detected can be removed from the logo index. In some implementations, criterion for removing non-logo images can include a product matching score being greater than a threshold product matching score, the product matching score being greater than the threshold product matching score, and a matched fraction of the product reference image being greater than a matched fraction threshold, and/or whether a face was detected in the image. In some implementations, the product matching score can be determined using a separate database of product images. For example, the product matching score can be obtained by building a matcher using the product images as the reference image set and querying the logo images against the product matcher. Similarly, and in some implementations, a face score is obtained from another independent face detection module.

The resulting logo index (e.g. the logo index 210 of FIG. 2) can be accessed to resolve image search queries and to identify one or more logos in an image query. In particular, the logo images of the logo index can be used to build a logo recognition model that can be processed using a logo recognition engine. A query image can be received (e.g., a user inputs a query image using a computing device), and the logo recognition engine can match the query image with the logo images of the logo index. For example, a user can submit an image query using a computing device that communicates with the computer system 108 of FIG. 1, which stores the logo index, and which processes the image query. One or more logo names can be output if a match is found. For example, the computer system 108 of FIG. 1 can output one or more logo names to the computing device accessed by the querying user.

In some implementations, multiple image templates of the logo index are provided as reference templates, each containing a number of extracted features as discussed above. A search tree is built using the features provided in the reference templates. When an input query image is received, a corresponding query image template is generated. For each feature in the query image template, similar reference features in the search tree are searched. These similar features are grouped by the reference templates that they belong to. Each potential match to a reference template is refined by geometric constraints, which can be based on the fact that the spatial layout of matched feature points in both the query image and the reference image should agree with each other. A match score is computed for each matched reference template. If the match score of a particular reference template exceeds a pre-defined threshold, the name corresponding to the particular reference template is provided as output. In some implementations, multiple names can be output.

Figure 6:
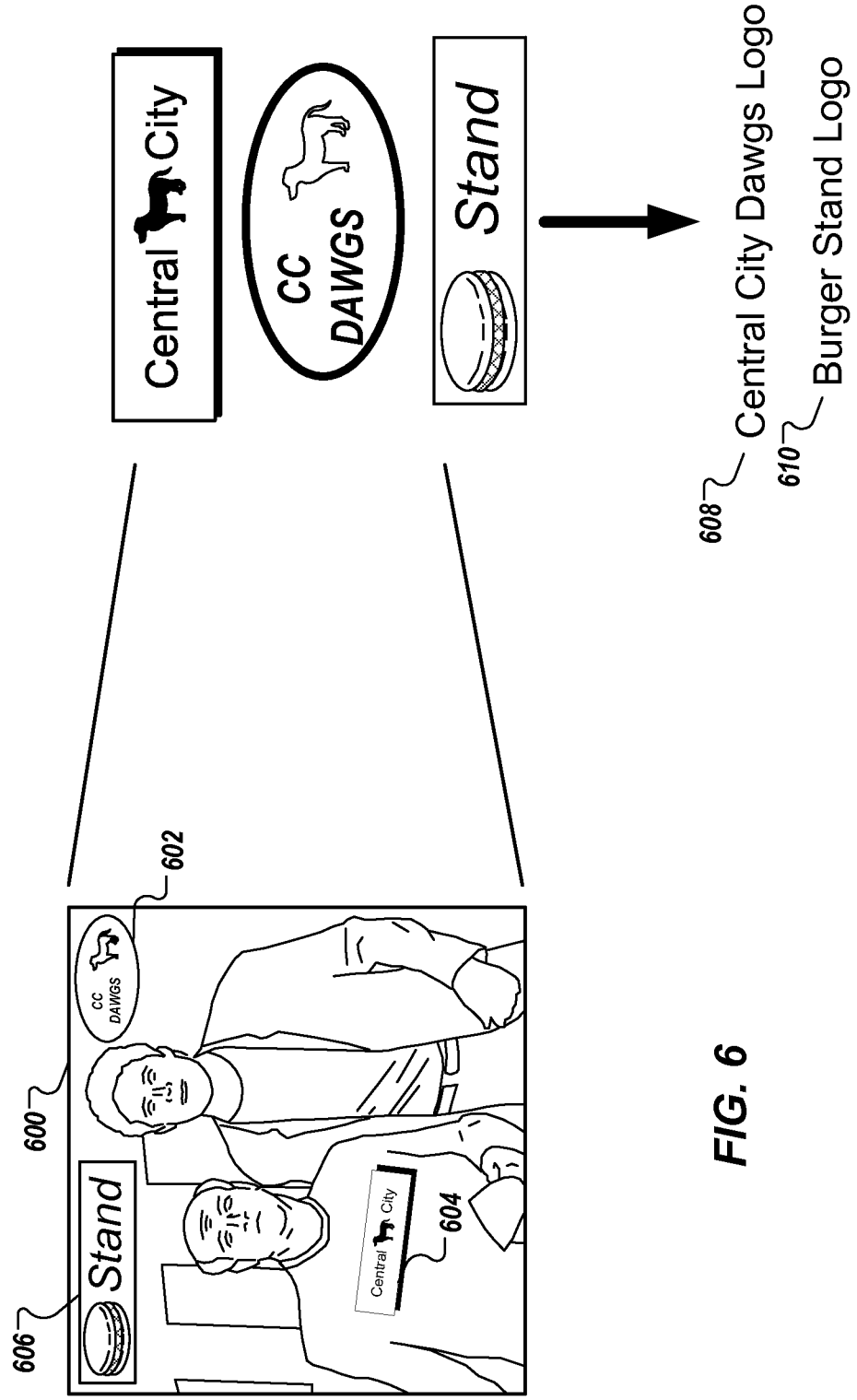
FIG. 6 illustrates an example extraction of brand logos from an example query image.

FIG. 6 illustrates an example extraction of brand logos from an example query image 600. The example query image 600 includes example logos 602, 604 and 606. The example logos 602 and 604 correspond to logos for the Central City Dawgs, the fictional sports team used as an example above. The example logo 606 corresponds to a logo for a fictional fast food company, "Burger Stand." The example query image 600 can be provided as input to a logo identification service. For example, the user of a computing device can upload the query image 600 to a server that provides a logo identification service. The logo identification service can process the query image 600 to identify one or more of the example logos 602, 604, 606, as discussed above. In particular, the logo identification service accesses a logo index (e.g., the logo index 210 of FIG. 2) to determine names corresponding to the example logos identified in the query image 600. The logo identification service can provide the names as output to the user. In the example of FIG. 6, the name "Central City Dawgs Logo" 608 and "Burger Stand Logo" 610 can be provided as output.

Figure 7:
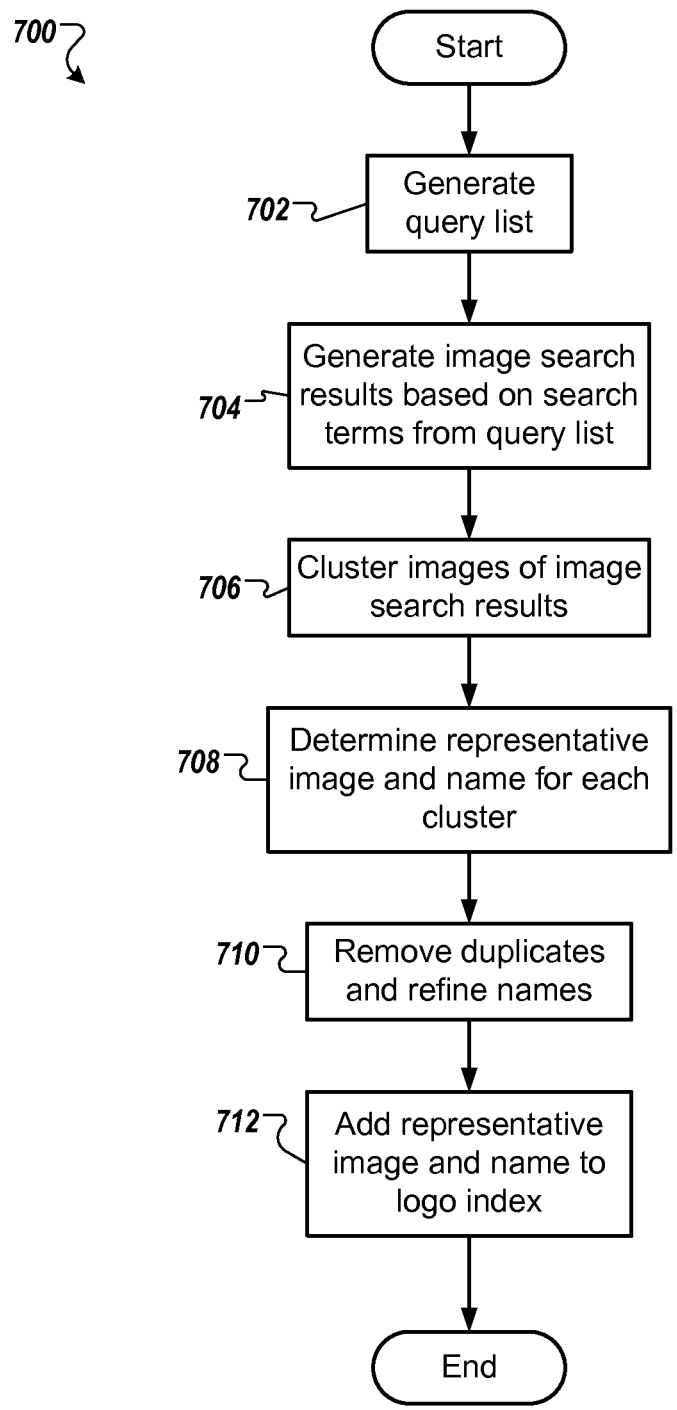
FIG. 7 is a flowchart of an example process for extracting images for logos.

FIG. 7 is a flowchart of an example process 700 for extracting images for logos. A query list is generated (702). For example, the query list generation module 200 of FIG. 2 can generate the query list based on the query log 212, as discussed above. The query list includes one or more image search queries. Image search results are generated based on an image search query of the query list (704). For example, the image search module 202 of FIG. 2 can input the image search query into an image searching service and can receive corresponding image search results. The image search results include multiple images potentially corresponding to a logo.

The images of the image search results are clustered (706). For example, the cluster module 204 of FIG. 2 can process the images to provide multiple image clusters, as discussed in detail above. A representative image and a name are determined for each cluster (708). For example, the representative image module 206 of FIG. 2 can process the clusters and the image search query to identify a representative image and generate a name for each cluster. Duplicate representative images are removed and names are refined (710). For example, the duplicate and refining module 208 of FIG. 2 can process the representative images and corresponding names to remove duplicate representative images and refine the corresponding names. The representative images and corresponding names are added to a logo index (712). For example, the logo index 210 of FIG. 2 can receive the representative images and corresponding names and add them to an existing logo index or can generate a new logo index based thereon. The process 700 repeats (704) through (712) for each image search query of the query list.

Figure 8:
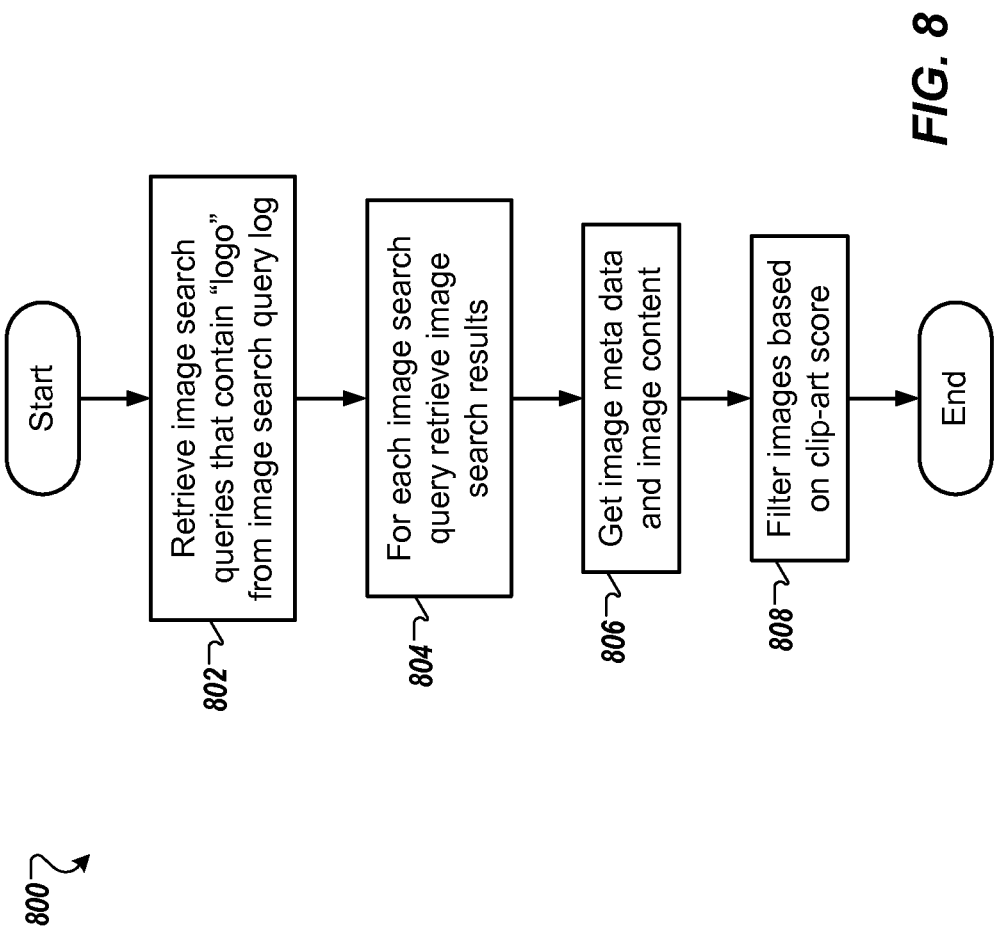
FIG. 8 is a flowchart of an example process for obtaining image data based on image search queries.

FIG. 8 is a flowchart of an example process 800 for obtaining image data based on image search queries. The example process 800 includes actions that can be executed as sub-actions of actions of the example process 700 of FIG. 7 (e.g., (702) and (704)). Image search queries that include "logo" are retrieved from a query log (802). For each image search query, image search results are retrieved (804). Image metadata and image content for each image of the image search results are retrieved (806). The images in the image search results are filtered based on clipart score (808), as discussed above.

Figure 9:
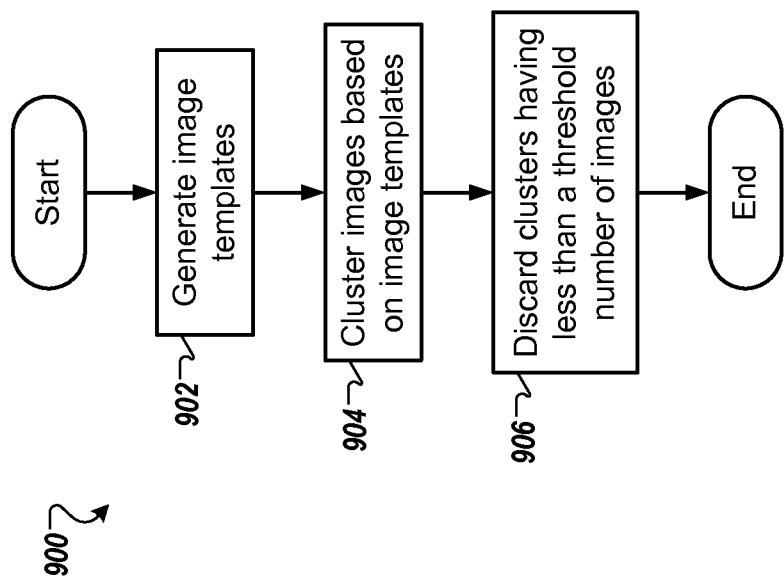
FIG. 9 is a flowchart of an example process for clustering image data and determining a representative image for each cluster.

FIG. 9 is a flowchart of an example process 900 for clustering image data and determining a representative image and corresponding name for each cluster. The example process 900 includes actions that can be executed as sub-actions of actions of the example process 700 of FIG. 7 (e.g., (706) and (708)). Image templates are generated for each image of the image search results (902). The images of the image search results are clustered based on the image templates (904), as discussed above. Clusters having less than a threshold number of images populated therein are discarded (906).

Figure 10:
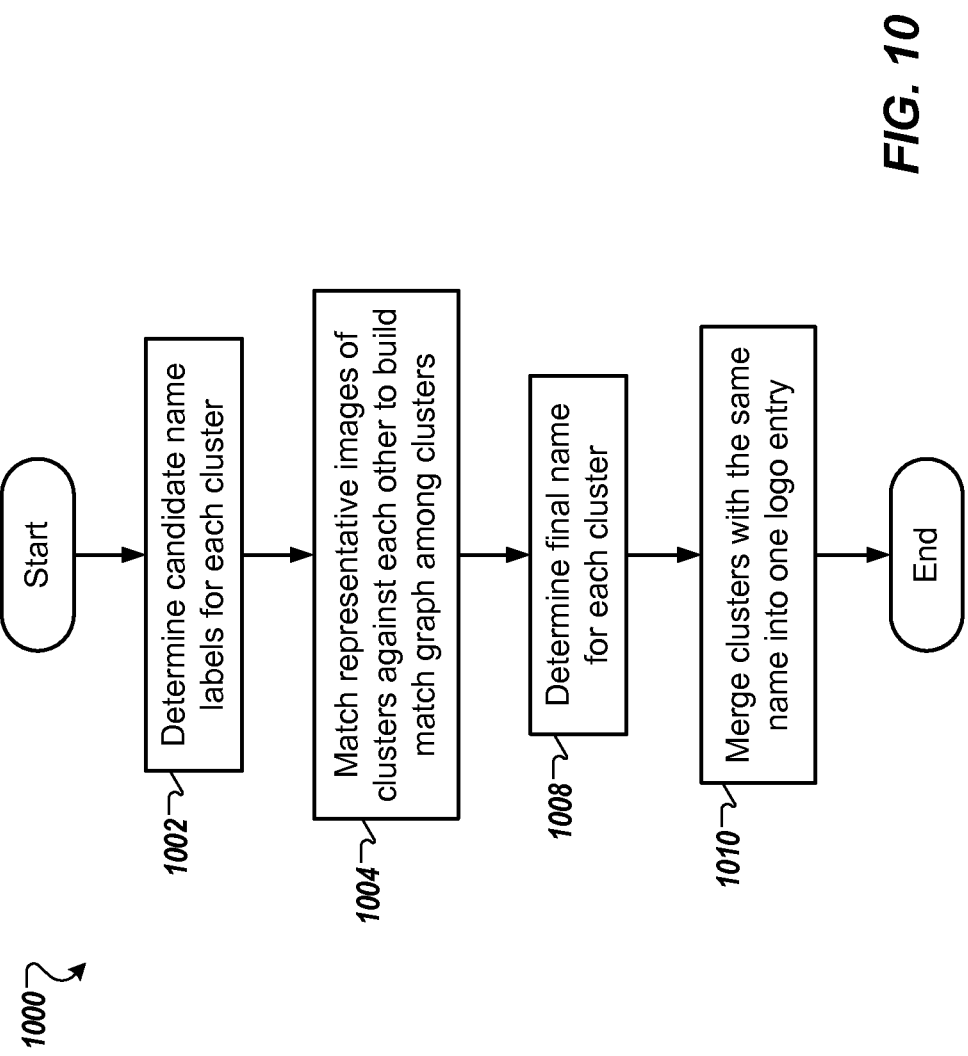
FIG. 10 is a flowchart of an example process for refining image data.

FIG. 10 is a flowchart of an example process 1000 for refining cluster image data. The example process 1000 includes actions that can be executed as sub-actions of actions of the example process 700 of FIG. 7 (e.g., (708) and (710)). Candidate name labels are determined for each cluster (1002), as discussed above. Representative images of clusters are matched against each other to build a match graph among the clusters (1004), as discussed above. A final name is determined for each cluster based on the match graph (1008). Clusters having the same name are merged to provide one logo entry into the logo index (1010).

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. Operations that can be performed on the client or multiple clients can be performed on a server or multiple servers. For example, the operations described with reference to FIGS. 7-10 may be performed on a client (e.g., client 102), on a server (e.g. one or both of servers 112, 114), or combination thereof. For example, "displaying" a document (e.g., an HTML document) on a client can also include preparing the document on the server and transmitting the document from the server to the client for display (e.g., on an LCD display).

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular implementations of the present disclosure have been described. Other implementation s are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A system comprising:
   one or more processors;
   a computer-readable medium coupled to the one or more processors having instructions stored thereon which, when executed by the one or more processors, cause the one or more processors to perform operations comprising:
   generating a query list comprising a plurality of logo search queries, wherein generating a query list comprises:
      searching a query log based on a term;
      identifying one or more image search queries of the query log corresponding to the term; and
      populating the query list with the one or more image search queries;
   for each logo search query of the plurality of logo search queries:
      generating a plurality of image search results, each image search result comprising image data, and
      clustering the plurality of image search results into a plurality of clusters, each cluster comprising a plurality of images of the plurality of image search results;
   extracting, for each cluster of the plurality of clusters, a representative image to provide a plurality of representative images, and a name corresponding to the representative image to provide a plurality of names; and
   providing the plurality of representative images and the plurality of names to a logo index, the logo index being accessible to identify one or more logo images in a query image.

2. The system of claim 1, wherein each of the plurality of image search results comprises a document identification and image meta-data.

3. The system of claim 1, wherein the actions further comprise:
   determining an image score for each image of the image search results;
   comparing the image score of an image to a threshold image score; and
   removing the image from the image search results when the image score is less than the threshold image score.

4. The system of claim 1, wherein the actions further comprise:
   determining a number of images populating a cluster of the plurality of clusters;
   comparing the number of images to a threshold number of images; and
   removing the cluster from the plurality of clusters when the number of images is less than the threshold number of images.

5. The system of claim 1, wherein clustering comprises:
generating an image template for each image of the plurality of image search results to provide a plurality of image templates;
determining a similarity score based on a first image template and a second image template; and
clustering an image corresponding to the first image template and an image corresponding to the second image template into a cluster when the similarity score is greater than a threshold similarity score.

6. The system of claim 1, wherein extracting a representative image comprises:
identifying an image of a plurality of images in each cluster having a highest document count score as an initial image;
comparing the initial image to other images in the plurality of images;
identifying an image of the other images as a matching image; and
identifying one of the initial image and the matching image as a representative image of a corresponding cluster.

7. The system of claim 6, wherein identifying an image of the other images as a matching image comprises:
determining a matching score based on the initial image and the image of the other images; and
identifying the image of the other images as the matching image when the matching score is greater than a threshold matching score.

8. The system of claim 6, wherein identifying one of the initial image and the matching image as a representative image of a corresponding cluster comprises:
determining a quality score of the initial image;
determining a quality score of the matching image; and
identifying the initial image as the representative image when the quality score of the initial image is greater than the quality score of the matching image, and identifying the matching image as the representative image when the quality score of the matching image is greater than the quality score of the initial image.

9. The system of claim 1, wherein the actions further comprise:
identifying a first logo search query and a second logo search query as duplicate logo search queries in the query list; and
merging a representative image and name corresponding to the first logo search query and a representative image and name the second logo search query to provide a merged representative image and name.

10. The system of claim 9, wherein identifying a first logo search query and a second logo search query as duplicate logo search queries comprises:
removing pre-defined terms from each of the first logo search query and the second logo search query to provide a modified first logo search query and a modified second logo search query, respectively; and
determining that the modified first logo search query and the modified second logo search query exactly match.

11. The system of claim 9, wherein identifying a first logo search query and a second logo search query as duplicate logo search queries comprises:
determining an edit distance between the first logo search query and the second logo search query; and
determining that the edit distance is less than a threshold edit distance.

12. The system of claim 9, wherein identifying a first logo search query and a second logo search query as duplicate logo search queries comprises:
determining a first set of image identifiers corresponding to image search results of the first logo search query;
determining a second set of image identifiers corresponding to image search results of the second logo search query; and
determining that the first logo search query and the second logo search query are duplicates based on the first set of image identifiers and the second set of image identifiers.

13. The system of claim 12, wherein determining that the first logo search query and the second logo search query are duplicates is based on an intersection of the first set of image identifiers and the second set of image identifiers.

14. The system of claim 12, wherein determining that the first logo search query and the second logo search query are duplicates is based on a ratio of overlapping image identifiers of the first set of image identifiers and the second set of image identifiers.

15. The system of claim 9, wherein the actions further comprise matching images between image search results associated with each of the first logo search query and the second logo search query to provide a number of matched images, wherein identifying a first logo search query and a second logo search query as duplicate logo search queries is based on the number of matched images.

16. The system of claim 1, wherein the actions further comprise:
processing one or more representative images of the logo index to determine a presence of product packaging in the one or more representative images; and
removing a representative image and name from the logo index when the presence of product packaging is determined in the representative image.

17. The system of claim 1, wherein the actions further comprise:
processing one or more representative images of the logo index to determine a presence of one or more faces in the one or more representative images; and
removing a representative image and name from the logo index when the presence of one or more faces is determined in the representative image.

18. A non-transitory computer-readable medium coupled to one or more processors having instructions stored thereon which, when executed by the one or more processors, cause the one or more processors to perform operations comprising:
generating a query list comprising a plurality of logo search queries, wherein generating a query list comprises:
searching a query log based on a term;
identifying one or more image search queries of the query log corresponding to the term; and
populating the query list with the one or more image search queries;
for each logo search query of the plurality of logo search queries:
generating a plurality of image search results, each image search result comprising image data, and
clustering the plurality of image search results into a plurality of clusters, each cluster comprising a plurality of images of the plurality of image search results;
extracting, for each cluster of the plurality of clusters, a representative image to provide a plurality of representative images, and a name corresponding to the representative image to provide a plurality of names; and
providing the plurality of representative images and the plurality of names to a logo index, the logo index being accessible to identify one or more logo images in a query image.

19. A computer-implemented method, comprising:
generating a query list comprising a plurality of logo search queries, wherein generating a query list comprises:

searching a query log based on a term;
identifying one or more image search queries of the query log corresponding to the term; and
populating the query list with the one or more image search queries;

for each logo search query of the plurality of logo search queries:
generating a plurality of image search results, each image search result comprising image data, and
clustering the plurality of image search results into a plurality of clusters, each cluster comprising a plurality of images of the plurality of image search results;

extracting, for each cluster of the plurality of clusters, a representative image to provide a plurality of representative images, and a name corresponding to the representative image to provide a plurality of names; and providing the plurality of representative images and the plurality of names to a logo index, the logo index being accessible to identify one or more logo images in a query image.

* * * * *